United States Patent [19]

Wittenzelliner

[11] Patent Number: 4,919,569

[45] Date of Patent: Apr. 24, 1990

[54] PROCESS FOR DISPOSING OF WASTE

[76] Inventor: Siegfried Wittenzelliner, 24 Florgate Road, Farmingdale, N.Y. 11735

[21] Appl. No.: 269,575

[22] Filed: Nov. 10, 1988

[51] Int. Cl.$^5$ .............................................. E02D 3/12
[52] U.S. Cl. ..................................... 405/128; 405/129
[58] Field of Search ............... 405/128, 129; 252/626, 252/633; 52/576; 264/37, 38

[56] References Cited

U.S. PATENT DOCUMENTS

| | | | |
|---|---|---|---|
| 3,466,873 | 9/1969 | Present | 405/128 |
| 4,270,329 | 6/1981 | Moore | 52/576 |
| 4,428,700 | 1/1984 | Lennemann | 405/128 |
| 4,430,256 | 2/1984 | Rustum | 405/128 X |
| 4,519,338 | 5/1985 | Kramer et al. | 405/128 X |
| 4,668,128 | 5/1987 | Hartley et al. | 405/128 X |
| 4,784,802 | 11/1988 | Mallory et al. | 405/128 X |

Primary Examiner—Dennis L. Taylor
Attorney, Agent, or Firm—Bauer & Schaffer

[57] ABSTRACT

A process for the safe and substantially permanent disposal of contaminated medical waste by providing a container, partially filling the container with a fluid, hardenable resin such as an epoxy resin, disposing the waste as the resin in the partially filled container; filling the container with additional resin, and encasing the waste, hardening or curing the resin encasing the waste and removing the block of waste encased in the resin from the container for appropriate disposal in the sea or other appropriate environments.

7 Claims, 1 Drawing Sheet

PROCESS FOR DISPOSING OF WASTE

This invention relates to a process for disposing of solid contaminated material. More particularly, the invention relates to a process for disposing of medical or other toxic waste.

BACKGROUND OF THE INVENTION

Disposition of medical waste such as, for example, contaminated hypodermic needles and syringes has become a serious problem in recent years. Frequently, such materials are disposed of in the sea and wash ashore, causing health and sanitation authorities to close shore-line areas to access by the public. Thus, there exists a need for a process of disposing of medical waste in a safe and permanent manner which does not result in contamination of the environment into which such waste is disposed. The present invention fulfills such a need.

While it is true that various processes and apparatus have been developed to dispose of various types of waste materials such as disclosed in U.S. Pat. Nos. 4,077,901; 4,459,211; 4,459,212; and 4,518,507 which disclose encapsulation of different types of waste materials in various types of resins and solidification of waste materials which are liquid or semiliquid. The prior art disclosures all relate to the chemical bonding or physical bonding of the toxic or contaminated waste with a detoxifying molecular encapsulator. The thus treated materials are then loaded into an encapsulating membrane of water-impermeable polymeric material, they do not solve the problem of the safe disposition of medical wastes, as does the present invention. On the other hand, the present invention, although it is disclosed herein as it applies to medical waste for purposes of simplicity, can also be employed in the disposition of other types of waste material since it does not depend upon molecular, atomic or similar bonding reactions of the toxic particles with the encapsulator.

BRIEF STATEMENT OF THE INVENTION

In accordance with the invention, there is provided a process for disposal of medical waste comprising the steps of:

(a) providing a container, partially filling the container with a fluid, hardenable resin which is noncohesive with the container;

(b) disposing medical waste on the fluid, hardenable resin disposed in the container;

(c) substantially filling the container with additional resin and encasing the medical waste therein;

(d) hardening the resin; and (e) removing for dumping the hardened resin from the container having the medical waste encased therein.

THE DRAWINGS

In order to describe process of this invention more fully, reference is directed to the accompanying drawings which are to be taken in conjunction with the following description and in which drawings.

DESCRIPTION OF THE PREFERRED EMBODIMENTS

Figure 1:
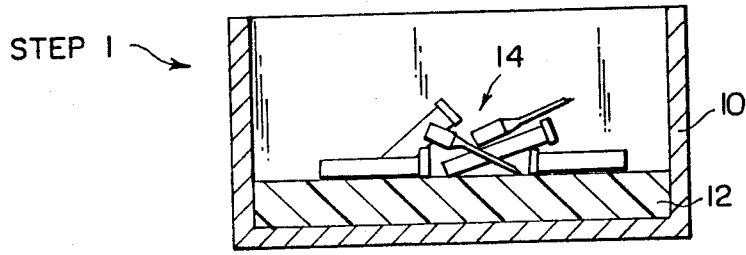
FIG. 1 is a diagrammatic elevational view in section of the process of the present invention, showing a container partially filled with a fluid, hardenable resin and with contaminate needles disposed on the resin.

Referring now to FIG. 1, in accordance with the process of this invention, a form or supporting container 10 is provided. The container may be of any convenient size and shape, not necessarily rectangular, so long as it is large enough to easily contain the contaminated material together with sufficient resin to encase the waste material and of a size which may be conveniently and efficiently handled for disposal such as by dumping into the sea, stored in a dump or warehouse or other convenient place. As shown in FIG. 1, container 10 is partially filled or a bottom provided preferably to about one fifth of its capacity with a suitable fluid, hardenable epoxy resin 12 which is noncohesive with container 10. The partial layer of fluid provides a substrate on which the contaminant materials can be deposited without fear of contaminating the container itself. Thereafter the contaminants such as medical waste material, syringes, pads, needles, etc. disposed on the resin.

Figure 2:
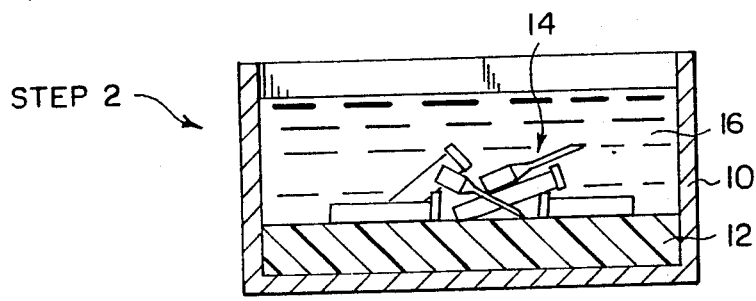
FIG. 2 is a diagrammatic elevational view in section of the container illustrated in FIG. 1, substantially completely filled with resin.
Figure 3:
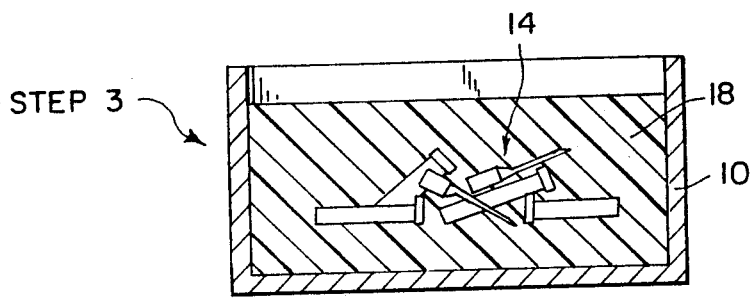
FIG. 3 is a diagrammatic elevational view in section of the container illustrated in FIG. 2 with the resin hardening or curving.

In any event, referring next to FIG. 2, once the contaminated material 14 are disposed on the resin present in the container, additional resin 16 is added thereto to substantially fill the container 10 and fully encase the needles. After which the resin is simply permitted to harden or cure as illustrated in FIG. 3 at ambient temperatures or at elevated temperatures by application of heat in any suitable manner for a period of time until the resin has hardened.

Figure 4:
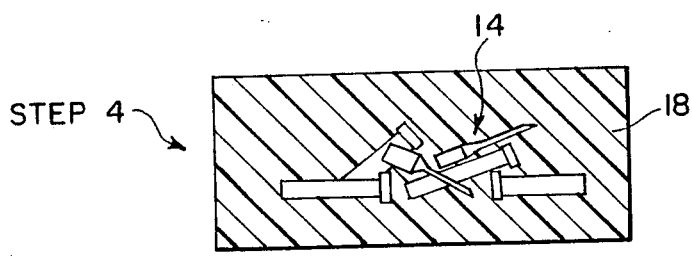
FIG. 4 is a diagrammatic elevational view in section of the hardened resin encasing the contaminated needles removed from the container and ready for disposition.

Once hardening and encasing of the medical waste has been effected the hardened resin block 18 containing the encased waste material as shown in FIG. 4 is simply removed in any convenient manner from the container stored with other similarly formed blocks to be later dumped into the sea, stored in a dump or warehouse or the like.

Preferably, the form or container 10 is premade from the same resin as is eventually used to encase or embed the waste—that is, the container can be precast or molded with a bottom and side wall or walls of the resin and used as a selfstanding receptable, without any exterior support. This simplifies the system of use. However, once the precase container is filled with resin, it becomes an integral part of the finished block 18.

In accordance with the invention, it is to be understood that container 10 is made of another plastic which is preferably easily releasable from the resin used to embed the waste material. It may also be made of glass, wood, or metallic material lined or unlined with plastic such as, for example, stainless steel or stainless steel alloys and the like. The nonplastic containers may be lined with the plastic resin in situ or as precast. The particular material from which the nonplastic containers is made is selected so that it is noncohesive with the resin employed therewith and in which the waste material is encased.

While an epoxy resin is preferably employed because it is nonbiodegradable and nontoxic, it is to be understood that in accordance with the invention, other resins which are water-insoluble or water impermeable may also be employed. Such resins include polyurethane resins, vinyl ester resins, polyester resins and mixtures thereof, polyethylene resins, polystyrene resins, and the like. Therefore, the toxic material of the container and the resin employed therewith will be noncohesive with each other. Preferably, the resin will be a fluid, hardenable resin which may be hardened—that is, cured either at ambient temperatures of about 30 to 50 degrees Celcius, or cured upon application of heat to temperatures in excess of 50 degrees Celcius. Since the lower substrate of resin or the precast container and the upper layer of encasing resin are preferably the same, the block of resin thus cured becomes unitary, cohesive, and without seams or interfaces capable of being broken apart.

A particularly adaptable resin is that sold under the trademark "Poly-Cat" by WITTKAT Medical Waste Disposal System, 24 Florgate Road, Farmingdale, NY 11735. "Poly-Coat" is solvent free, water clear, chemically inert, and has lower temperature curing. However, it has high adhesion to concrete, steel, and wood and should not be used with such containers unless it is intended to allow the container to be disposed of also. It has a relatively long pot life even under low heat cure.

It is also possible to employ sand or other filler material to increase the bulk of the resin and to add weight to the block thus formed. It has been found that the addition of sand or other similar silicate materials adds strength and compressibility to the resin being used when admixed with the resin before pouring. The filler may also be used as a separate blanket layer over the waste before embedded.

The present invention presents many advantages. For example, the process can be carried out in a relatively simple manner with readily available materials—that is, with containers and resins which are available commercially and which can be determined to be suitable for use with each other by routine testing. The encased medical waste material is permanently and safely disposed of in a dump, warehouse, and preferably the sea, without fear of contamination of the environment. Since the resin is not degradable within any harmful half-life period, the resin itself is not toxic, nor can the contaminant or the material enclosed therein leach or pass through resin.

The amount of contaminant material so enclosed is dependant solely upon the size of the container 10 and the size of contaminant materials. Certainly larger containers can be supplied to hold devices and apparatus layer than needles or syringes, as for example radioactive x-ray equipment, prosthesis, etc. Further, the present invention should not be thought solely useful to dispose of medical waste but is also useful to dispose of industrial waste of factories and other processing equipment.

Moreover, as previously mentioned, any medical waste material as well as waste material of other types can be disposed of in accordance with this invention.

The foregoing description of the principles to this invention and certain modes of its application is to be construed as illustrative only. Other changes in shape, size, arrangements of parts, and function may be employed without departure from the true scope of the invention as further defined in the appended claims.

What is claimed is:

1. A process for disposal of medical waste comprising the steps of:
    (a) providing a container, partially filling said container with a fluid, hardenable water insoluble epoxy resin which is noncohesive with said container and disposing medical waste in the fluid, hardenable resin disposed in said container;
    (b) substantially filling said container with additional fluid, hardenable epoxy resin to combine with the initial resin and encasing said medical waste therein;
    (c) hardening said resin until said resin comprises a rigid non-soluble block;
    (d) removing the hardened epoxy resin block from said container having said medical waste encased therein; and
    (e) thereafter dumping or using said block.

2. A process according to claim 1 wherein the container is a metallic container.

3. A process according to claim 2 wherein the container is stainless steel.

4. A process according to claim 1 wherein the container is glass.

5. A process according to claim 1 wherein the resin is an epoxy resin.

6. Process according to claim 1 wherein the resin is a polyurethane.

7. A process according to claim 1 including the step of adding a filler to said resin.

* * * * *

UNITED STATES PATENT AND TRADEMARK OFFICE
CERTIFICATE OF CORRECTION

PATENT NO. : 4,919,569

DATED : April 24, 1990

INVENTOR(S) : SIEGFRIED WITTENZELLNER

It is certified that error appears in the above-identified patent and that said Letters Patent is hereby corrected as shown below:

On the title page, item [76], should read:

-- [76] Inventor: Siegfried Wittenzellner,
24 Florgate Road, Farmingdale,
N. Y. 11735 --.

Signed and Sealed this

Ninth Day of July, 1991

Attest:

HARRY F. MANBECK, JR.

*Attesting Officer*

*Commissioner of Patents and Trademarks*